(12) United States Patent
Sakurai

(10) Patent No.: US 8,625,955 B2
(45) Date of Patent: Jan. 7, 2014

(54) INFORMATION RECORDING APPARATUS, INFORMATION DISTRIBUTION SERVER, INFORMATION RECORDING SYSTEM AND INFORMATION RECORDING METHOD

(75) Inventor: Hisao Sakurai, Saitama (JP)

(73) Assignee: Sony Corporation, Tokyo (JP)

( * ) Notice: Subject to any disclaimer, the term of this patent is extended or adjusted under 35 U.S.C. 154(b) by 399 days.

(21) Appl. No.: 12/750,985

(22) Filed: Mar. 31, 2010

(65) Prior Publication Data

US 2010/0260474 A1 Oct. 14, 2010

(30) Foreign Application Priority Data

Apr. 14, 2009 (JP) ................................. 2009-097927

(51) Int. Cl.
*H04N 5/931* (2006.01)
(52) U.S. Cl.
USPC ............................ 386/212; 386/330; 386/334
(58) Field of Classification Search
USPC ......................................... 386/212, 330, 334
See application file for complete search history.

(56) References Cited

U.S. PATENT DOCUMENTS

| | | | | |
|---|---|---|---|---|
| 2002/0150392 A1* | 10/2002 | Yoo et al. | ....................... | 386/111 |
| 2003/0235391 A1* | 12/2003 | Gates et al. | ..................... | 386/46 |
| 2005/0278336 A1* | 12/2005 | Ito | ..................................... | 707/9 |
| 2007/0116427 A1* | 5/2007 | Youn | ............................... | 386/83 |
| 2007/0250873 A1* | 10/2007 | Ohyama et al. | ................. | 725/82 |

FOREIGN PATENT DOCUMENTS

| | | |
|---|---|---|
| JP | 10-257455 | 9/1998 |
| JP | 2001-309349 | 11/2001 |
| WO | WO 98/26608 | 6/1998 |

\* cited by examiner

*Primary Examiner* — Thai Tran
*Assistant Examiner* — Jose Mesa
(74) *Attorney, Agent, or Firm* — Sony Corporation

(57) ABSTRACT

An information recording apparatus includes a stream receiver configured to receive a stream including therein video and audio data regarding a program, a program information transmitter configured to transmit program information regarding the program to a server connected thereto via a communication network, a writing information receiver configured to receive writing information from the server, which is used for processing for writing the video and audio data into a recording medium, and a recording section configured to, under the condition in which absolute time information included in the stream and absolute time information included in the writing information having been received from the server are synchronized with each other, write the video and audio data included in the stream into the recording medium, as well as the writing information.

15 Claims, 12 Drawing Sheets

INFORMATION RECORDING APPARATUS, INFORMATION DISTRIBUTION SERVER, INFORMATION RECORDING SYSTEM AND INFORMATION RECORDING METHOD

BACKGROUND OF THE INVENTION

1. Field of the Invention

The present invention relates to information recording apparatuses, information distribution servers, information recording systems and information recording methods, and in particular, it relates to an information recording apparatus, an information distribution server, an information recording system and an information recording method, which enable storing contents of television programs and the like in recording media.

2. Description of the Related Art

Recently, information recording apparatuses, each of which enables writing contents of television programs and the like into a recording medium to store them therein, have been in widespread use. When storing a content in a recording medium by using such an information recording apparatus, usually, a piece of format information including a piece of information for performing random access and the like is written into the recording medium, in addition to a string of data regarding the body of the content. Therefore, among such information recording apparatuses, there have been certain kinds of information recording apparatuses, in each of which, unless a piece of format information is created from a string of data included in the body of a content, it is difficult to store the string of data in a recording medium. For example, in video recording devices each configured to write a string of data included in a content into a Blue-ray disc (hereinafter, such a video recording device will be called a BD recorder), it is necessary to create a piece of writing information, which is equivalent to the above-described piece of format information, from the string of data included in the body of the content, and write the string of content data into the Blu-ray disc, as well as the created piece of writing information.

With respect to existing methods which allow users to acquire information regarding programs users desire to watch and listen to, for example, a method, which allows a user terminal connected to a communication network to acquire electronic information resulting from searching through a server connected thereto, has been disclosed (for example, refer to Japanese Unexamined Patent Application Publication No. 2001-309349). Further, an information transmission method, which enables providing Internet accessable devices with Internet URL information, which is displayed on an image reproduced from a content, and thereby, allows users to easily access for the information, has been disclosed (for example, refer to Japanese Unexamined Patent Application Publication No. Hei 10-257455). Further, a technology with respect to an apparatus and method for acquiring data regarding TV programs users desire to watch and listen to has been disclosed (for example, refer to International Publication No. 98/26608 Pamphlet).

SUMMARY OF THE INVENTION

However, processing for creating appending information from a string of data included in the body of a content results in a very large amount of processing load, and thus, leads to a disadvantage in that it is difficult for BD recorders to promptly write a content into a recording medium. All the above-described patent documents are related to technologies which are useful for users to obtain information for reference, but are unuseful for the BD recorders to perform processing for writing a content into a recording medium.

Accordingly, it is desirable to provide an information recording apparatus, an information distribution server, an information recording system and an information recording method, which are renewed and improved so as to be capable of reducing processing load imposed when writing a string of content data into a recording medium.

According to a first embodiment of the present invention, an information recording apparatus is provided. The information recording apparatus includes a stream receiver configured to receive a stream including therein video and audio data regarding a program; a program information transmitter configured to transmit program information regarding the program to a server connected thereto via a communication network; a writing information receiver configured to receive writing information from the server, which is used for processing for writing the video and audio data into a recording medium; and a recording section configured to, under the condition in which absolute time information included in the stream and absolute time information included in the writing information having been received from the server are synchronized with each other, write the video and audio data included in the stream into the recording medium, as well as the writing information.

The above-described information recording apparatus may include a synchronization section configured to perform control of the writing processing performed by the recording section so that absolute time information included in the stream and absolute time information included in the writing information having been received from the server are synchronized with each other.

The above-described information recording apparatus may further include a time information extraction section configured to extract absolute time information included in the stream; and a user clock time information appending section configured to append user clock time information regarding a clock time, at which the absolute time information is extracted, to the absolute time information; wherein the program information transmitter may be further configured to transmit the absolute time information, to which the user clock time information is appended, to the server, and the writing information receiver may be further configured to receive writing information having been created under the condition in which, on the basis of the user clock time information, clock time information provided by the server is caused to be synchronized with clock time information provided by the information recording apparatus.

The above-described information recording apparatus may further include a time counting section configured to include absolute clock time information; wherein the user clock time information may be obtained on the basis of the absolute clock time information included in the time counting section.

In the above-described information recording apparatus, the writing processing performed by the recording section may be performed concurrently with broadcasting of the program.

According to a second embodiment of the present invention, an information distribution server is provided. The information distribution server includes a program information receiver configured to receive program information regarding a program recorded by an information recording apparatus from the information recording apparatus via a communication network; a stream receiver configured to receive a stream including therein video and audio data regarding the program; a writing information creation section configured to create writing information which is used when the information recording apparatus performs processing for writing the video and audio data into a recording medium; and a writing information transmitter configured to transmit the writing information to the information recording apparatus.

The above-described information distribution server may further include a time information extraction section configured to receive user clock time information from the information recording apparatus, which is information regarding a clock time at which absolute time information included in a stream is extracted by the information recording apparatus, and extract absolute time information included in the stream; and a server clock time information appending section configured to append server clock time information regarding a clock time, at which the absolute time information is extracted, to the absolute time information; wherein the writing information creation section may be further configured to create the writing information under the condition in which the user clock time information and the server clock time information are synchronized with each other.

The above-described information distribution server may further include a time counting section configured to include absolute clock time information; wherein the server clock time information may be obtained on the basis of the absolute clock time information included in the time counting section.

The above-described information distribution server may further include a storage section configured to store therein preference information, which is information regarding a program having been previously recorded by the information recording apparatus, and content data having been previously acquired by the stream receiver; wherein the writing information creation section may be further configured to, in accordance with the preference information, create writing information regarding a program from the content data stored in the storage section.

In the above-described information distribution server according to claim 6, transmitting of the writing information performed by the writing information transmitter may be performed concurrently with broadcasting of the program.

According to a third embodiment of the present invention, an information recording system including an information recording apparatus and an information distribution server is provided. Further, the information recording apparatus includes a stream receiver configured to receive a stream including therein video and audio data regarding a program, a program information transmitter configured to transmit program information regarding the program to a server connected thereto via a communication network, a writing information receiver configured to receive writing information from the server, which is used for processing for writing the video and audio data into a recording medium, and a recording section configured to, under the condition in which absolute time information included in the stream and absolute time information included in the writing information having been received from the server are synchronized with each other, write the video and audio data included in the stream into the recording medium, as well as the writing information. Further, the information distribution server includes a program information receiver configured to receive program information regarding a program recorded by an information recording apparatus from the information recording apparatus via a communication network, a stream receiver configured to receive a stream including therein video and audio data regarding the program, a writing information creation section configured to create writing information which is used when the information recording apparatus performs processing for writing the video and audio data into a recording medium, and a writing information transmitter configured to transmit the writing information to the information recording apparatus.

According to a fourth embodiment of the present invention, an information recording method is provided. The information recording method includes the steps of receiving a stream including therein video and audio data regarding a program, performed by an information recording apparatus; transmitting program information regarding the program to a server via a communication network, performed by the information recording apparatus; acquiring the same stream as the stream including therein video and audio data regarding the program, performed by the server; creating writing information from the video and audio data, performed by the server, the writing information being used when the information recording apparatus performs processing for writing the video and audio data into a recording medium; transmitting the writing information to the information recording apparatus via the communication network, performed by the server; and writing the video and audio data included in the stream into the recording medium, as well as the writing information, performed by the information recording apparatus, under the condition in which absolute time information included in the stream and absolute time information included in the writing information having been received from the server are synchronized with each other.

According to the above-described embodiments of the present invention, it is possible to reduce processing load imposed when an information recording apparatus performs processing for writing a string of content data into a recording medium.

DESCRIPTION OF THE PREFERRED EMBODIMENTS

Figure 1:
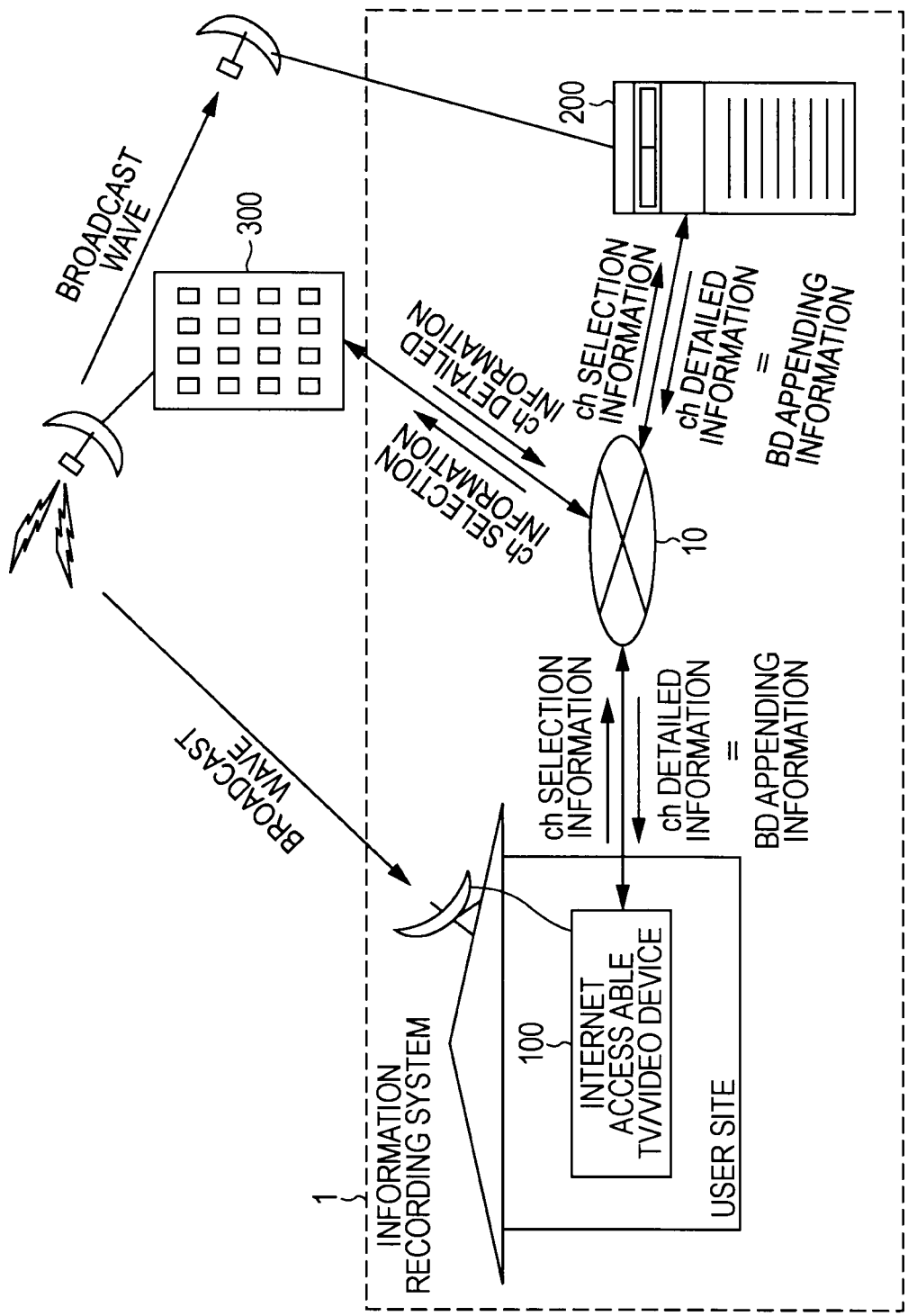
FIG. 1 is a diagram illustrating a specific example of a configuration of an information recording system according to an embodiment of the present invention.

Hereinafter, preferred embodiments according to the present invention will be described with reference to accompanying drawings. In this patent specification and accompanying drawings, components which have substantially the same functions and configurations are denoted by the same symbols, and thus, repeated descriptions thereof are omitted.

In addition, description will be made in the following order.
1. A specific example of a configuration of an information recording system according to an embodiment of the present invention
2. A specific example of a configuration of an information recording apparatus according to an embodiment of the present invention
3. A specific example of a configuration of an information distribution server according to an embodiment of the present invention
4. An example of a hardware configuration of an information recording apparatus according to an embodiment of the present invention
5. An example of a hardware configuration of an information distribution server according to an embodiment of the present invention
6. Format Information regarding a Blu-ray disc
7. A record processing method
8. A method of synchronization of a system clock of an information distribution server with a system clock of an information recording apparatus Firstly, a specific example of a configuration of an information recording system 1 according to an embodiment of the present invention will be described below with reference to FIG. 1. A section enclosed by a broken line represents the information recording system 1.

<1. A Specific Example of a Configuration of an Information Recording System>

FIG. 1 is a block diagram illustrating a specific example of a configuration of the information recording system 1 according to an embodiment of the present invention. The information recording system 1 according to an embodiment of the present invention is configured to include an information recording apparatus 100 and an information distribution server 200. The information recording apparatus 100 and the information distribution server 200 are each configured to receive streams (strings of compressed video and audio data) each including video and audio data, and the like, regarding programs transmitted from a broadcasting station 300. In addition, in this patent specification, the above-described string of compressed video and audio data will be hereinafter abbreviated by a stream. The information recording apparatus 100 and the information distribution server 200 can be communicated with each other via a communication network 10, such as the Internet, and, for example, pieces of channel information regarding contents having been video recorded in the information recording apparatus 100 can be transmitted to the information distribution server 200. Further, the information distribution server 200 can transmit pieces of writing information, which are necessary for the information recording apparatus 100 to write the corresponding strings of content data into a recording medium, to the information recording apparatus 100 via the communication network 10. The broadcasting station 30 is configured to transmit streams to both the information recording apparatus 100 and the information distribution server 200 via a broadcast wave. The broadcasting station 30 is configured to, for example, transmit streams via a broadcast wave, such as a satellite broadcast (BS or CS) wave or a ground digital broadcast wave. Hereinafter, each of components included in the information recording system 1 will be described.

<2. A Specific Example of a Configuration of an Information Recording Apparatus>

Figure 2:
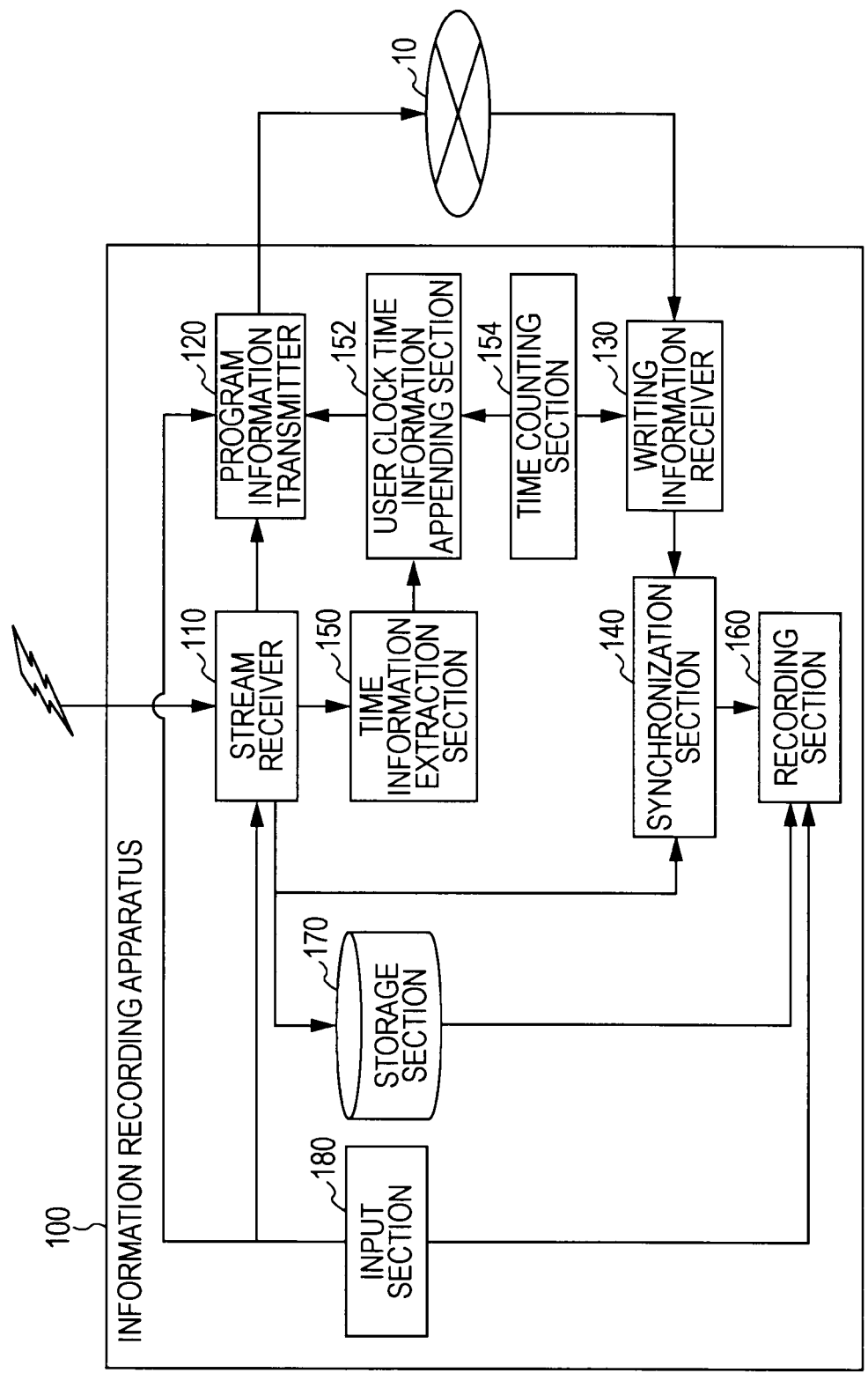
FIG. 2 is a block diagram illustrating a specific example of a configuration of an information recording apparatus according to an embodiment of the present invention.

FIG. 2 is a block diagram illustrating a specific example of a configuration of the information recording apparatus 100 according to an embodiment of the present invention. The information recording apparatus 100 is configured to, for example, include a stream receiver 110, a program information transmitter 120, a writing information receiver 130, and a synchronizing section 140. Moreover, the information recording apparatus 100 is configured to, for example, include a time information extraction section 150, a user clock time information appending section 152, a time counting section 154, a recording section 160, a storage section 170, and input section 180. Processing performed by each of the sections included in the information recording apparatus 100 is realized by processing performed by the corresponding hardware or causing a CPU included in the information recording apparatus 100 to execute the corresponding program.

The stream receiver 110 is configured to receive streams in accordance with operations, and the like, inputted by the input section 180. The stream receiver 110 is configured to supply the received streams to the time information extraction section 150. Further, the stream receiver 110 is configured to be capable of storing strings of video and audio data, and the like, included in the received streams in the storage section 170. Moreover, the stream receiver 110 is configured to acquire an electrical program guide from a certain broadcasting wave and store the acquired electrical program guide in the storage section 170.

The program information transmitter 120 is configured to, from the input section 180, the stream receiver 110 or the like, acquire a piece of program information regarding a program to be recorded by the information recording apparatus 100 at present or in the future, and transmit the acquired piece of program information to the information distribution server 200 via the communication network 10. The piece of program information regarding a program to be recorded by the information recording apparatus 100 at present or in the future includes, for example, a piece of information regarding a channel on which a content to be recorded by the information recording apparatus 100 is being broadcasted or to be broadcasted, and a clock time at which a content to be recorded by the information recording apparatus 100 was started to be broadcasted or is to be started to be broadcasted. Further, the program information transmitter 120 is configured to acquire pieces of record history information, which are pieces of information regarding programs having been recorded so far by the information recording apparatus 100, from the stream receiver 110, the storage section 170 or the like, and transmit the acquired pieces of record history information to the information distribution server 200 via the communication network 10. Further, the program information transmitter 120 is configured to transmit pieces of absolute time information having been extracted by the time information extraction section 150 and pieces of user clock time information having been appended to the corresponding pieces of absolute time information to the information distribution server 200.

The writing information receiver 130 is configured to receive pieces of writing information to be written into a recording medium, such as a Blu-ray disc, from the information distribution server 200 via the communication network 10. Further, the writing information receiver 130 is configured to supply the pieces of writing information and pieces of scene change detection information and the like having been received from the information distribution server 200 to the synchronization section 140. In addition, the writing information receiver 130 may be configured to store the pieces of writing information and the pieces of scene change detection information having been received from the information distribution server 200 in the storage section 170. Furthermore, the information recording apparatus 100 according to an embodiment of the present invention is generally configured to cause the writing information receiver 130 to receive pieces of writing information having been created by the information distribution server 200, but may be configured to create pieces of writing information by performing arithmetic operations on strings of content data.

The synchronization section 140 is configured to acquire pieces of writing information from the writing information receiver 130. The synchronization section 140 is configured to receive blocks of content data from the stream receiver 110. The synchronization section 140 is configured to cause the blocks of content data and the pieces of writing information having been received from the information distribution server 200 to correspond to each other. Further, the synchronization section 140 is configured to perform control of writing processing performed by the recording section 160 so as to cause a piece of absolute time information included in each of the blocks of content data and a piece of absolute time information included in each of the pieces of writing information having been received from the information distribution server 200 to correspond to each other.

The time information extraction section 150 is configured to extract pieces of absolute time information embedded in the stream having been received by the stream receiver 110. For example, in the case where the stream is transmitted in the format of the MPEG2 transport stream (MPEG2-TS), the time information extraction section 150 extracts program clock references (PCRs), each being a standard reference value of a system, embedded in the received stream.

The user clock time information appending section 152 is configured to acquire pieces of user clock time information, each indicating a clock time at which a piece of absolute time information is extracted from a stream by the time information extraction section 150, and append the acquired pieces of user clock time information to the corresponding pieces of absolute time information having been extracted by the time information extraction section 150. In this case, the user clock time information appending section 152 is configured to acquire the pieces of user clock time information on the basis of clock time information included in the time counting section 154.

The time counting section 154 is configured to function as a clock generator of the information recording apparatus 100, and generate pieces of clock time information. The time counting section 154 is configured to supply pieces of clock time information to the user clock time information appending section 152. In addition, the time counting section 154 may be configured to maintain constantly accurate clock time information by utilizing the global time system (GTS).

The recording section 160 is configured to be controlled by the time synchronization section 140, and perform processing for writing strings of content data having been acquired by the stream receiver 110, as well as pieces of writing information having been transmitted from the information distribution server 200, into a recording medium, such as a Blu-ray disc. Here, the recording medium, which is a target for writing processing performed by the recording section 160, is a removable disc, such as a magnetic disc, an optical disc or a magneto-optical disc, and a piece of writing information is necessary when a string of data is written thereinto, the piece of writing information being specific to the string of data to be written thereinto and being written thereinto in addition to the string of data.

Further, the recording section 160 is configured to, in the case where a string of content data having been previously acquired by the stream receiver 110 is stored in the storage section 170, write the string of content data stored in the storage section 170 into a recording medium, as well as a piece of writing information having been received from the information distribution server 200.

The storage section 170 is configured to be capable of storing therein strings of content data having been received by the stream receiver 110. Further, the storage section 170 is configured to be capable of storing therein pieces of writing information. Further, the storage section 170 is configured to store therein pieces of preference information, each being a piece of information regarding a program which was previously recorded in the information recording apparatus 100. Further, the storage section 170 may be configured to store programs which are executed when processes included in the information recording apparatus 100 are performed. In addition, the storage section 170 is configured to include a recording medium, such as a hard disc drive.

The input section 180 is configured to receive instructions and the like which are inputted by users who desire to operate the information recording apparatus 100. Electrical signals generated in accordance with instructions inputted to the input section 180 by users are transferred to the stream receiver 110, the recording section 140 and the like.

<3. A Specific Example of a Configuration of an Information Distribution Server>

Figure 3:
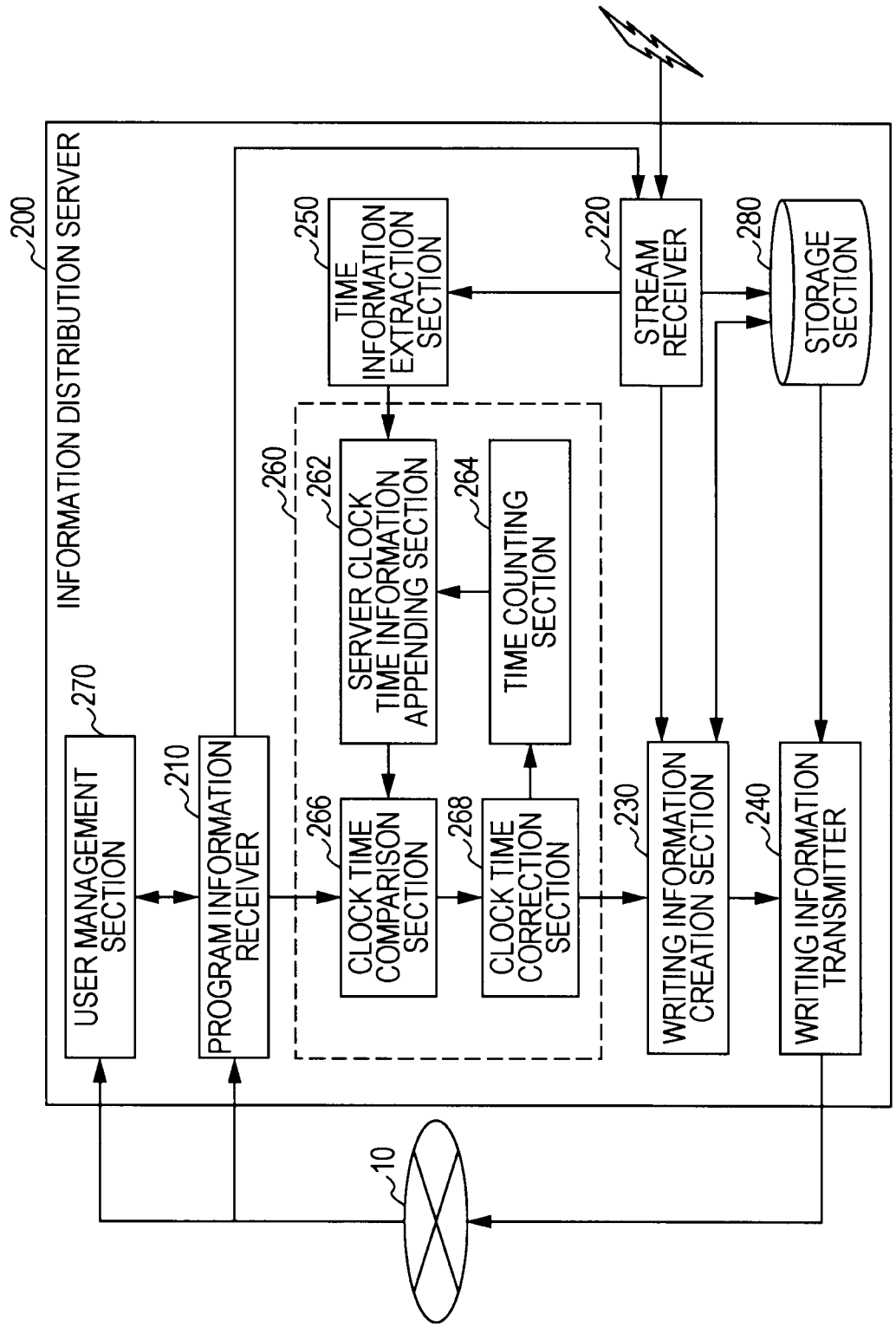
FIG. 3 is a block diagram illustrating a specific example of a configuration of an information distribution server according to an embodiment of the present invention.

FIG. 3 is a block diagram illustrating a specific example of a configuration of the information distribution server 200 according to an embodiment of the present invention. The information distribution server 200 is configured to, for example, include a program information receiver 210, a stream receiver 220, a writing information creation section 230 and a wiring information transmitter 240. Further, the information distribution server 200 is configured to, for example, a time information extraction section 250, a clock time management section 260, a user management section 270 and a storage section 280.

The program information receiver 210 is configured to receive pieces of program information, each regarding a program to be recorded at present or in the future, from the information recording apparatus 100 via the communication network 10. Further, the program information receiver 210 is configured to receive pieces of preference information, each regarding a program having been previously recorded by the information recording apparatus 100, from the information recording apparatus 100 via the communication network 10. The program information receiver 210 is configured to receive pieces of user clock time information, each being a clock time at which a piece of absolute time information included in a stream was extracted by the information recording apparatus 100, from the information recording apparatus 100 via the communication network 100. The program information receiver 210 is configured to determine receipt or reject of pieces of information having been transmitted from the information recording apparatus 100 in accordance with whether a permission by the user management section 270 is given to a user of the information recording apparatuses 100, or not.

The stream receiver 220 is configured to, in accordance with a piece of program information provided by the program information receiver 210, acquire a stream regarding the same program as that to be received by the information recording apparatus 100 from a broadcasting wave. The stream receiver 220 is configured to, once it is confirmed that a user of the information recording apparatus 100 is given a permission as a result of user authentication performed by the user management section 270, commence processing for acquiring the stream. Further, the stream receiver 220 is configured to acquire an electrical program guide from the broadcasting wave.

The writing information creation section 230 is configured to create pieces of writing information, which are necessary for the recording section 160 of the information recording apparatus 100 to write the corresponding string of content data into a recording medium, from blocks of data included in the main body of content data. Further, the writing information creation section 230 may be configured to, before the program information receiver 210 receives a piece of program information from the information recording apparatus 100, create pieces of writing information regarding a string of content data in advance in accordance with a piece of video-recording history information supplied by the program information receiver 210. The writing information creation section 230 is configured to create pieces of scene detection information from blocks of data included in the main body of content data. The writing information creation section 230 is configured so that the pieces of writing information and the pieces of scene detection information, having been created from the string of content data, are supplied to the writing information transmitter 240, or are stored in the storage section 280.

The writing information transmitter 240 is configured to transmit the pieces of writing information having been created by the writing information creation section 230 to the appropriate information recording apparatus 100 via the communication network 10. Further, the writing information transmitter 240 may be configured to transmit the pieces of writing information, having been stored in the storage section 280 by the writing information creation section 230, to the appropriate information recording apparatus 100 via the communication network 10.

The time information extraction section 250 is configured to extract pieces of absolute time information which are embedded in a stream acquired by the stream receiver 220. For example, in the case where the stream is transmitted in the format of the MPEG2 transport stream (MPEG2-TS), the time information extraction section 250 is configured to extract program clock references (PCRs) embedded in the stream, each being a standard reference value of a system.

The clock time management section 260 is configured to, for example, include a server clock time information appending section 262, a time counting section 264, a clock time comparison section 266, and a clock time correction section 268. The clock time management section 260 is configured to, by using these sections, include the function of maintaining the condition in which pieces of server clock time information and pieces of user clock time information are synchronized with each other, and the function of appending the pieces of server clock time information to the corresponding pieces of absolute time information having been extracted by the time information extraction section 250.

The server clock time information appending section 262 is configured to acquire pieces of server clock time information each indicating a clock time at which a piece of absolute time information is extracted from a stream by the time information extraction section 250, and append the acquired pieces of server clock time information to the corresponding pieces of absolute time information. The server clock time information appending section 262 is configured to acquire the pieces of server clock time information in accordance with clock time information included in the time counting section 264.

The time counting section 264 is configured to have clock time information and be capable of providing the server clock time information appending section 262 with the clock time information. Further, the time counting section 264 may be configured to have constantly accurate clock time information by utilizing the global time system (GTS).

The clock time comparison section 266 is configured to, by comparing each piece of user clock time information having been appended by the user clock time information appending section 152 of the information recording apparatus 100, and the corresponding piece of server clock time information having been appended by the server clock time information appending section 262, detect a time difference therebetween. The clock time comparison section 266 is configured to transmit a piece of information regarding the time difference between each piece of user clock time information and the corresponding piece of server clock time information to the clock time correction section 268.

The clock time correction section 268 is configured to cause clock time information included in the time counting section 264 and clock time information included in the information recording apparatus 100 to be synchronized with each other in accordance with the time difference having been detected by the clock time comparison section 266. In addition, in the case where both the time counting section 264 and the time counting section included in the information recording apparatus 100 have clock time information in accordance with the global time system, it is unnecessary for the clock time correction section 268 to perform processing for synchronization of the two kinds of clock time information.

The user management section 270 is configured to perform user authentication so as to determine whether each of the information recording apparatuses 100 is permitted to utilize the information distribution server 200, or not. The user management section 270 is configured to retain a piece of user information, such as a user ID and a password, for each user, and perform user authentication on the basis thereof. Further, for example, the user management section 270 may be configured so that pieces of information, each regarding the information recording apparatus 100 which has ever been permitted to utilize the information distribution server 200, are stored therein in advance, and afterward, by using the stored pieces information, upon receipt of an access from any of the information recording apparatuses 100 which have ever been permitted to utilize the information distribution server 200, a permission for the utilization thereof is immediately given thereto.

The storage section 280 is configured to store therein a string of content data having been acquired by the stream receiver 220. The storage section 280 is configured to store therein pieces of writing information having been created by the writing information creation section 230. Further, the storage section 280 is configured to store pieces of preference information therein, which are pieces of information regarding programs having been recorded by the appropriate information recording apparatus 100. Further, the storage section 280 is configured to store pieces of user information therein, which are necessary for the user management section 270 to perform user authentication. Furthermore, the storage section 280 may be configured to store programs therein, which are executed for performing processes included in the information distribution server 200.

<4. An Example of a Hardware Configuration of an Information Recording Apparatus>

Figure 4:
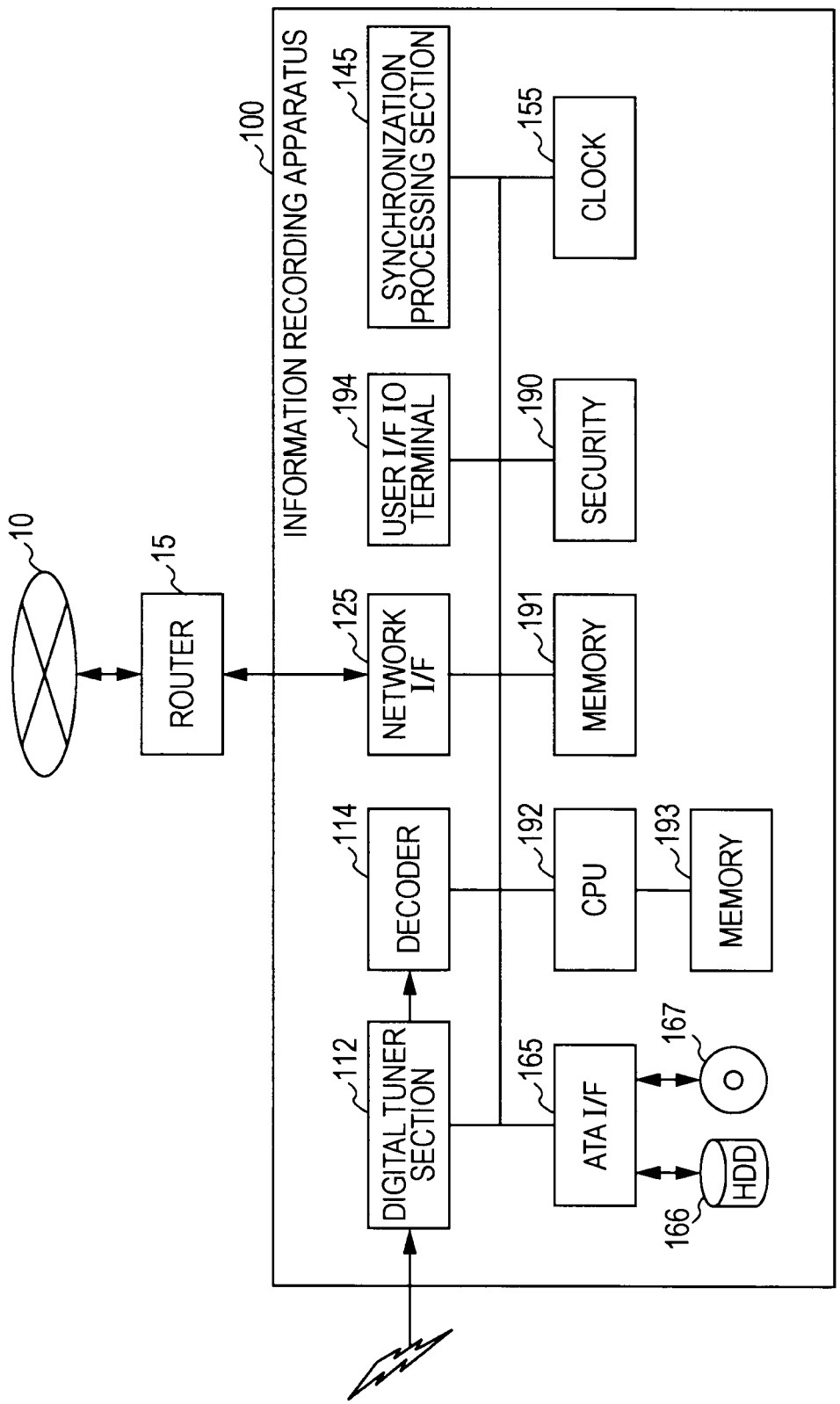
FIG. 4 is a block diagram illustrating a specific example of a hardware configuration of an information recording apparatus according to an embodiment of the present invention.

Subsequently, a hardware configuration of the information recording apparatus 100 according to an embodiment of the present invention will be described below. The information recording apparatus 100 according to an embodiment of the present invention is realized by employing a hardware configuration shown in FIG. 4.

The information recording apparatus 100 is configured to include, for example, a digital tuner 112, a decoder 114, a network interface (NETWORK I/F) 125, a user interface IO terminal (USER I/F IO terminal) 194 and a synchronization processing section 145. Further, the information recording apparatus 100 is configured to include, for example, an ATA interface (ATA I/F) 165, a CPU 192, a security 190, and a clock 155.

The digital tuner 112 is configured to perform processing on television broadcast signals, and thereby, extract prescribed transport streams. In the case of digital broadcasting, the digital tuner 112 is configured to receive broadcast wave signals transmitted from a digital antenna, and convert the received digital broadcast wave signals into MPEG2 transport streams (MPEG2-TSs).

The decoder 114 is configured to receive the MPEG2-TSs transmitted from the digital tuner 112, and convert audio signals and video signals included in the received MPEG2-TSs into digital audio signals and digital component signals, respectively. In addition, the digital tuner 112 and the decoder 114 correspond to the stream receiver 110.

The network interface 125 is a communication interface, which is configured to include, for example, a communication device and the like for connecting the information recording apparatus 100 to the communication network 10 via network repeaters, such as routers 15. Further, the network interface 125 may be a communication device incorporating therein a communication interface, such as a wireless local area network (LAN) interface, a wireless USB interface, or a wired communication interface. The network interface 125 corresponds to the program information transmitter 120, the writing information receiver 130 and the like included in the information recording apparatus 100.

The user interface 10 terminal 194 is an interface connecting to an external device, and, for example, is a connection port capable of communicating with an external device which can perform data transmission over a communication interface compliant with the High-Definition Multimedia Interface (HDMI) standard (trademark) and the like.

The synchronization processing section 145 is a piece of hardware configured to realize the functions of the time information extraction section 150 and the user clock time information appending section 152. The synchronization processing section 145 is configured to perform control of writing processing performed by the recording section 160 so as to cause blocks of content data and pieces of writing information having been received from the information distribution server 200 to correspond to each other. In audition, the functions of the synchronization section 140, the time information extraction section 150 and the user clock time information appending section 152 may be realized by processing resulting from causing the CPU 192 to execute the corresponding pieces of software.

The ATA interface is configured to perform control of processing for writing and reading of information recorded in a removal recording medium, such as a magnetic disc, an optical disc, a magneto-optical disc, or a semiconductor memory module. An optical drive 167, which is controlled by the ATA interface 165, is a drive configured to perform recording into a Blu-ray disc and the like, and corresponds to the recording section 160. Further, a storage device, such as a hard disc drive 166, which is controlled by the ATA interface 165, corresponds to the storage section 170.

The CPU 192 is configured to function as an arithmetic processing device and a control device, and perform control of the whole operations inside the information recording apparatus 100 in accordance with instructions included in various programs. Further, the CPU 192 may be a microprocessor. In addition, the CPU 192 may have dedicated memory modules.

The clock 155 is configured to function as a clock, and generate clock time information. The clock 155 may be configured to maintain constantly accurate clock time information by utilizing the global time system (GTS). The clock 155 corresponds to the time counting section 154.

The security 190 is a piece of hardware configured to perform user authentication processing, communication encryption processing and the like, which are necessary for the information recording apparatus 100 to acquire pieces of writing information from the information distribution server 200. In addition, the functions of the security 190 may be realized by processing resulting from causing the CPU 192 to execute the corresponding pieces of software stored in chips of memory 193.

<5. An Example of a Hardware Configuration of an Information Distribution Server>

Subsequently, a hardware configuration of the information distribution server 200 according to an embodiment of the present invention will be described below. The information distribution server 200 according to an embodiment of the present invention is realized by employing a hardware configuration shown in FIG. 5.

The information distribution server 200 is configured to include, for example, a receipt processing section 225, a video scene analysis section 227, a network interface (NETWORK I/F) 205, a security 275, a person/device information database 276, and an EPG database 229. Further, the information distribution server 200 is configured to include, for example, a disc medium formatting section 235, a CPU 290, a clock 265, and an ATA interface (ATA I/F) 285.

The receipt processing section 225 is a piece of hardware configured to perform processing regarding television broadcast signals, and thereby, extract prescribed transport streams. In the case of digital broadcasting, the receipt processing section 225 is configured to receive broadcast wave signals transmitted from a digital antenna, and convert the received digital broadcast wave signals into MPEG2 transport streams (MPEG2-TSs). The receipt processing section 225 corresponds to the stream receiver 220.

The video scene analysis section 227 is a piece of hardware configured to perform processing for creating pieces of scene detection information from a string of video data. In addition, the processing for creating pieces of scene detection information performed by the video scene analysis section 227 may be realized by causing the CPU 290 to execute the corresponding pieces of software.

The network interface 205 is a communication interface configured to include, for example, a communication device connecting the information distribution server 200 to the communication network 10, and the like. Further, the network interface 205 may be a communication device incorporating therein a communication interface, such as a wireless local area network (LAN) interface, a wireless USB interface, or a wired communication interface. The network interface 205 corresponds to the program information receiver 210, the writing information transmitter 240 and the like.

The security 275 is a piece of hardware which is necessary for the information distribution server 200 to perform user authentication processing, communication encryption processing, when the information distribution server 200 provides the information recording apparatus 100 with writing information. From a viewpoint of a copyright protection and a personal information protection, it is desirable to cause the security 275 to encrypt information transmitted and received by the information distribution server 200 and the information recording apparatus 100. Provided that an appropriate degree of encryption intensity is ensured, encryption processing may be performed by general encryption processing which is already included in devices. In addition, the functions of the security 275 may be realized by causing the CPU 290 to execute the corresponding pieces of software. The security 275 corresponds to the user management section 270 and the like.

The person/device database 276 is a device storing therein information regarding persons and devices utilizing the information distribution server 200. Further, the information regarding the persons and the devices, which is stored in the person/device information database 276, is supplied to the security 275. The person/device information database 276 corresponds to the storage section 280 and the like.

The EPG database 229 is a storage device storing therein the content of an electronic program guide (EPG) regarding programs to be recorded by the information recording apparatus 100. The EPG database 229 corresponds to the storage section 280 and the like.

The disc medium formatting section 235 is a piece of hardware which performs processing for creating pieces of writing information from the main body of content data, the writing information being written into a recording medium, in addition to the content data, by the recording section 160 of the information recording apparatus 100. In addition, the function of the disc medium formatting section 235 may be realized by processing resulting from causing the CPU 290 to execute the corresponding pieces of software. The disc medium formatting section 235 functions in conjunction with the video scene analysis section 227 and the like, and fulfills the functions of the writing information creation section 230 and the clock time management section 260.

The CPU 290 is configured to function as an arithmetic processing devise and a control devise, and perform control of the whole operations inside the information distribution server 200 in accordance with instructions included in various programs. Further, the CPU 290 may be a microprocessor.

The clock 265 is configured to function as a clock, and generate clock time information. The clock 265 may be configured to maintain constantly accurate clock time information by using the global time system (GTS). The clock 265 corresponds to the clock 264.

The ATA interface 285 is configured to perform writing and reading processing with respect to information recorded in a removable recording medium attached thereto, such as a magnetic disc, an optical disc, a magneto-optical disc or a semiconductor memory module.

Subsequently, as a preliminary step toward a specific description regarding a flow of processes up to the process of video recording, which is performed by the information recording apparatus 100 according to an embodiment of the present invention, appending information, which is format information necessary to be written into a Blue-ray disc in addition to content data to be written thereinto, will be described below. In the information recording system 100 according to an embodiment of the present invention, the appending information, which is format information necessary to be written into a Blue-ray disc in addition to content data to be written thereinto, is usually created by causing the writing information creation section 230 to perform arithmetic processing on the main body of content data and the like.

<6. Format Information Regarding a Blu-Ray Disc>

Figure 6:
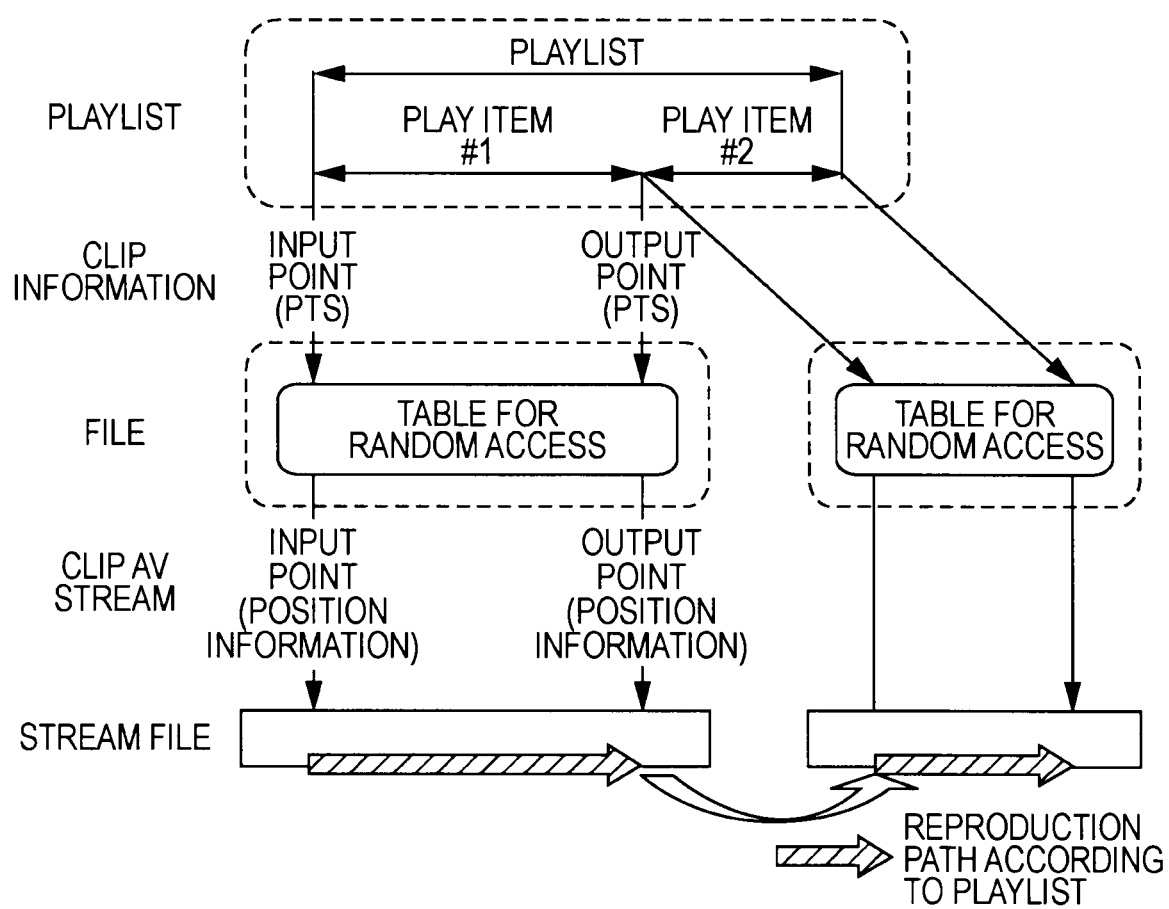
FIG. 6 is a diagram illustrating an example of a file format structure regarding a Blu-ray disc.

The Blu-ray disc format (BD-RE standard) has a file format structure shown in FIG. 6, including a playlist file, a clip information file and a clip AV stream file. That is, the file format structure includes a user recognizable content, which is named a playlist file, and files located therebelow.

Figure 5:
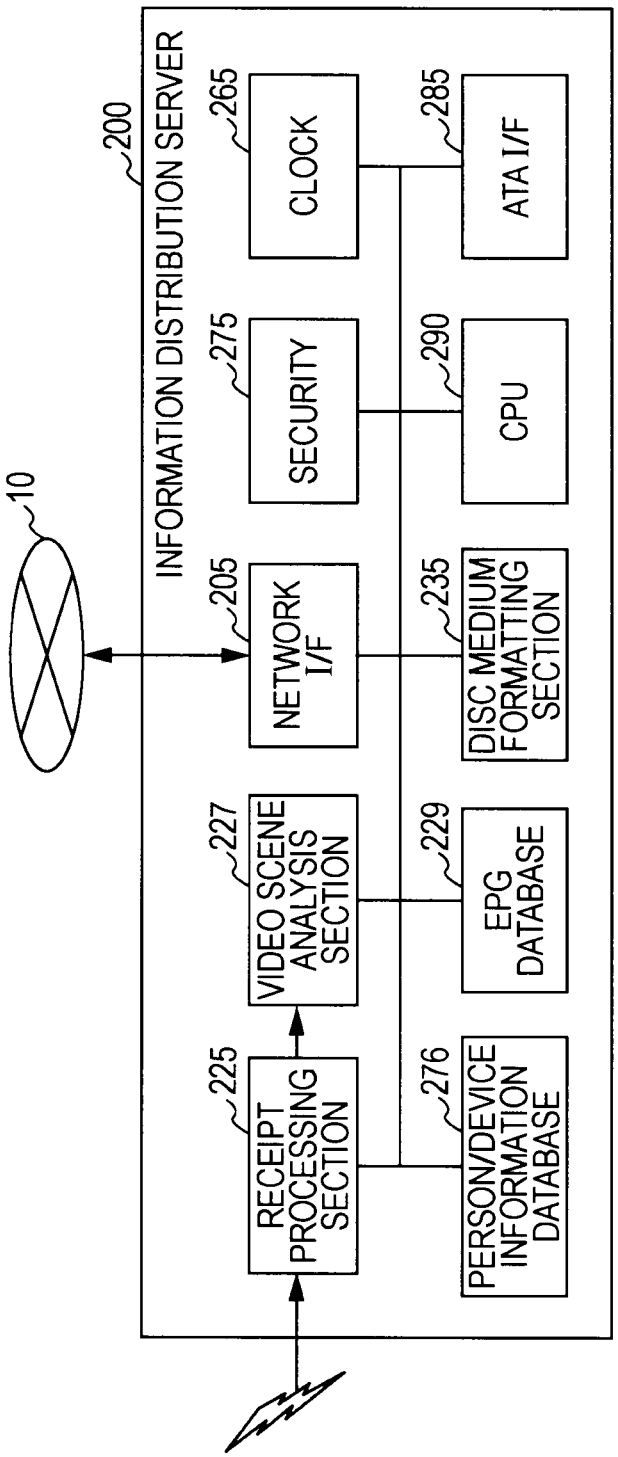
FIG. 5 is a block diagram illustrating a specific example of a hardware configuration of an information distribution server according to an embodiment of the present invention.
Figure 7:
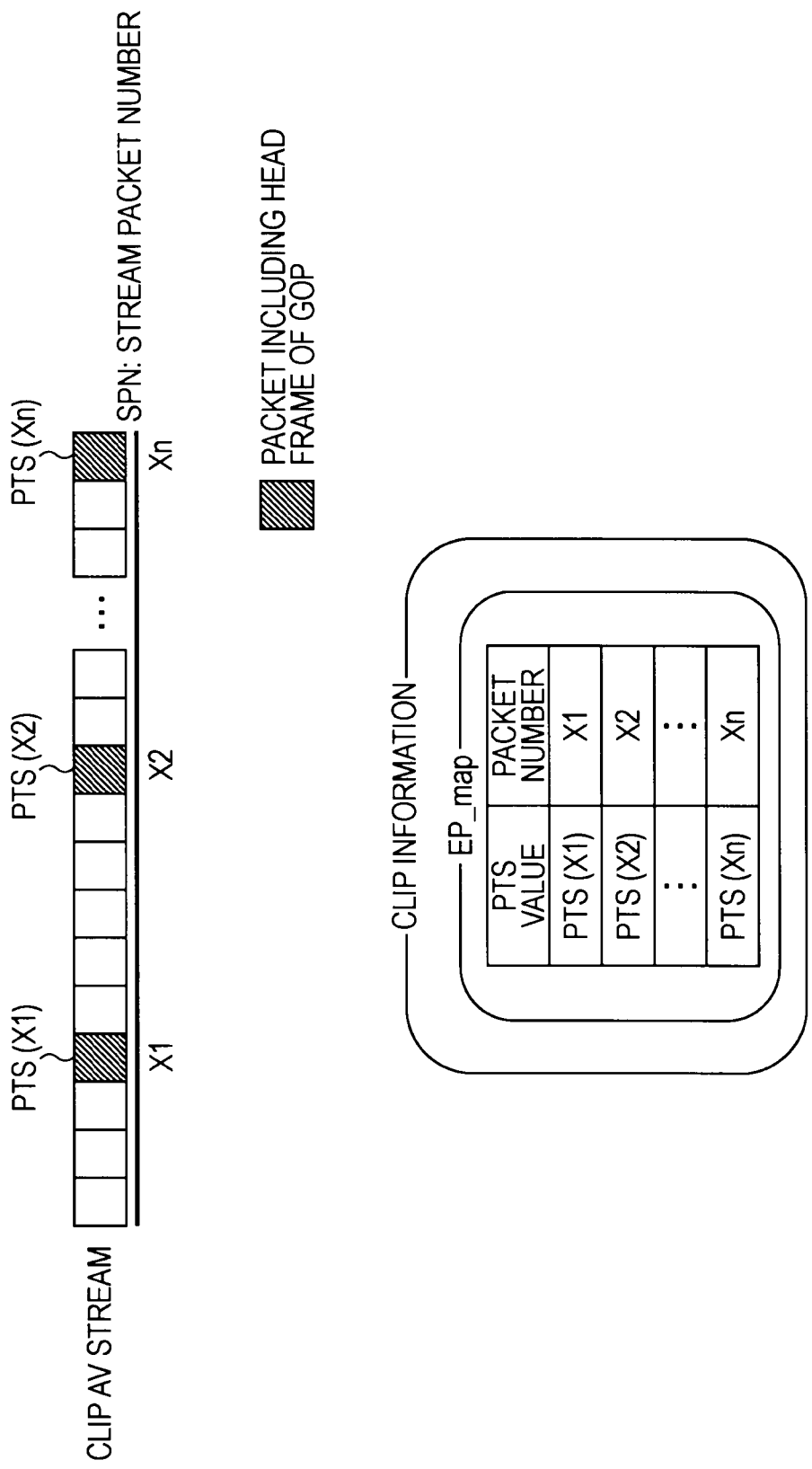
FIG. 7 is a diagram illustrating an example of a file format structure regarding a Blu-ray disc.

A portion denoted by "clip AV stream" in FIG. 5 represents the main body of content data. The playlist file is a file, in which reproduction intervals of the clip AV stream are arranged in an order of reproduction thereof, and includes pieces of reproduction control information which are necessary in reproducing and editing thereof. A clip information file includes information which is necessary to perform random access. The clip information file has a structure shown in FIG. 7, and includes information which is necessary to cause positions, at which head frames of GOPs are located, the GOP being a compression unit of a string of video data, and PTSs, which are time stamps embedded in an MPEG2-TS stream, to correspond to each other. In addition, the GOP is an abbreviation for "Group of Picture", and the PTS is an abbreviation for "Presentation Time Stamp". These groups of files include various pieces of information, such as a piece of information regarding scene switching of moving images. Appending information including these pieces of format information is created by performing arithmetic processing on content data, and is written into a Blu-ray disc, in addition to the content data. Further, without the appending information, any content data may not be written into a Blu-ray disc.

Therefore, in the case where the information recording apparatus 100 is allowed to receive a broadcast wave and directly perform processing for writing content data extracted from the broadcast wave into a Blu-ray disc, the above-described series of file creating processes are necessary. However, for the reason that performing the series of file creating processes leads to a significantly large amount of device loading (processing load), and thus, is unrealistic, existing BD recorders and the like do not include the function of creating the appending information concurrently with reproduction of content data. At present, it is difficult for an apparatus to perform processing for creation of the appending information, concurrently with reproduction of content data, unless a high-speed dedicated processor is included in the apparatus.

Therefore, existing BD recorders usually include a storage device of a large storage capacity, such as a hard disc drive, and existing typical BD recorders employ a method, in which, after a string of content data regarding a broadcast program is written into the storage device of a large storage capacity once, BD format information is created anew, and the string of content data is written into a Blu-ray disc, as well as the created BD format information. Therefore, as described above, from a viewpoint of user-friendliness, with respect to existing BD recorders, there is still room for further increase of processing speed.

<7. A Record Processing Method>

Figure 8:
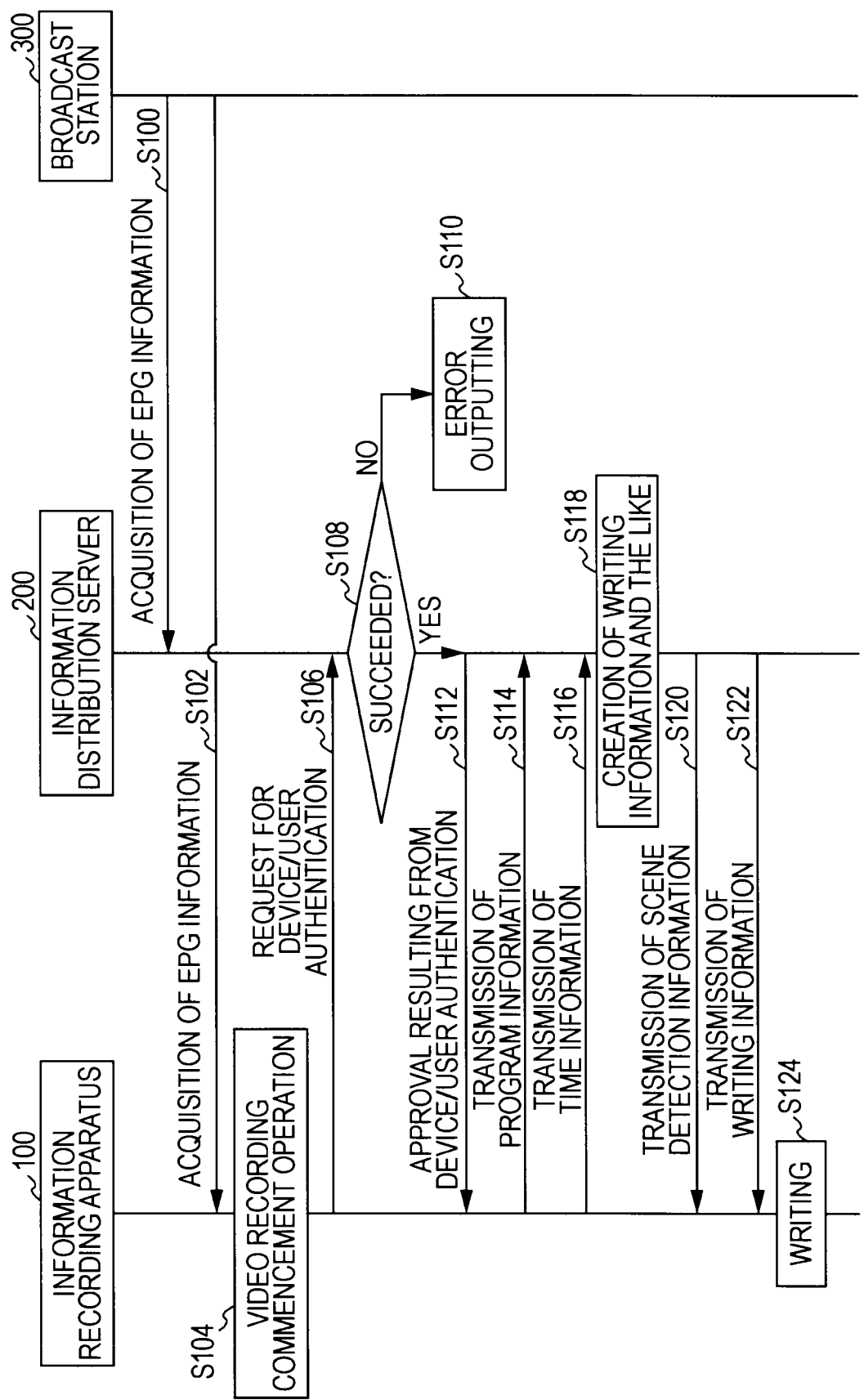
FIG. 8 is a sequence diagram illustrating an example of processes performed by an information recording apparatus according to an embodiment of the present invention, which enable users to write a content into a recording medium concurrently with watching and listening to the content.

Subsequently, processes performed by the information recording apparatus 100 according to an embodiment of the present invention, which allow users to watch and listen to a content, and concurrently therewith, write the content into a recording medium, such as a Blu-ray disc, will be described below with reference to FIG. 8. FIG. 8 is a sequence diagram illustrating a flow of processes which allow users to watch and listen to a content, and concurrently therewith, write the content into a recording medium.

<A First Record Processing Method>

The stream receiver 220 of the information distribution server 200 acquires an electrical program guide from a broadcast wave (in step S100). The stream server 110 of the information recording apparatus 100 also acquires the electrical program guide from the broadcast wave (in step S102). Once an operation of instructing the commencement of video recording is inputted to the input section 180 (in step S104), the information recording apparatus 100 transmits a piece of user information, such as a user ID and a password, to the information distribution server 200, and requests for performing user authentication (in step S106). The information distribution server 200 performs user authentication on the basis of the received piece of user information (in step S108), and outputs an error massage in the case where the result of the user authentication is a failure (in step S110). In the case where the result of the user authentication is a success, the information distribution server 200 transmits a permission for utilization of the information distribution server 200 to the information recording apparatus 100 (step S112).

Subsequently, in accordance with the operation and the like which was inputted to the input section 180, the program information transmitter 120 transmits a piece of program information, such as a channel and a name of a program targeted for video recording, to the information distribution server 200 via the communication network 10 (in step S114). Here, in addition to the piece of program information, the program information transmitter 120 transmits a piece of absolute time information, which was extracted from a stream by the time information extraction section 150, and a piece of user clock time, which is a clock time at which the piece of absolute time information was extracted, to the information distribution server 200 (in step S116). The stream receiver 220 refers to the piece of program information, which was transmitted from the information recording apparatus 100 to the information distribution server 200, and thereby, acquires a stream including therein the same content as that targeted for video recording. The writing information creation section 230 receives the stream from the stream receiver 220, and creates a piece of scene detection information and a piece of writing information regarding the program to be video recorded by the information recording apparatus 100 (in step S118). The writing information transmitter 240 transmits the piece of scene detection information regarding the program to be recorded by the information recording apparatus 100 to the information recording apparatus 100 (in step S120).

Further, the writing information transmitter 240 transmits the piece of writing information, which was created by the writing information creation section 230, to the information recording apparatus 100 (in step S122). The recording section 160 included in the information recording apparatus 100 performs writing of the piece of writing information, in addition to a string of data included in the content, into a recording medium (in step S124). In this case, the synchronization section 140 performs control of writing processing performed by the recording section 160 so as to cause a string of data included in the stream having been received by the stream receiver 110 and the piece of writing information having been received from the information distribution server 200 to correspond to each other.

According to this record processing method, causing the information distribution server 200, which is capable of performing high-speed processing, to undertake the processes of creating pieces of wiring information results in speedy creation of the pieces of writing information and prompt provision of the created pieces of writing information to the information recording apparatus 100. Therefore, a burden on the information recording apparatus 100, resulting from causing the information recording apparatus 100 to perform processing for writing content data into a recording medium, is reduced to a great degree. This reduction of the burden on the information recording apparatus 100 enables users to watch and listen to a program being broadcasted, and concurrently therewith, write the content of the program being broadcasted into a Blu-ray disc in real time or in quasi-real-time by using the information recording apparatus 100.

Figure 9:
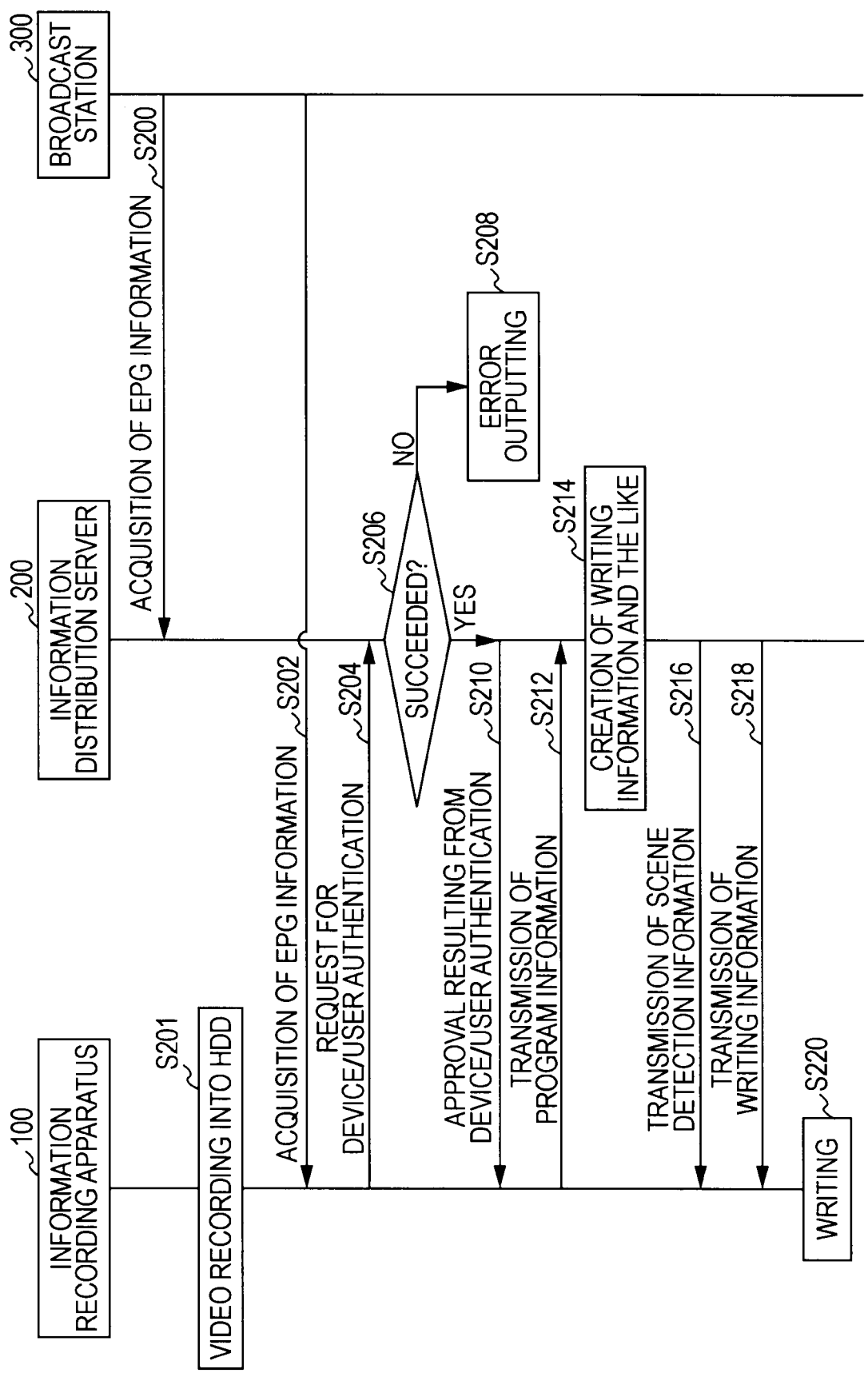
FIG. 9 is a sequence diagram illustrating an example of processes performed by an information recording apparatus according to an embodiment of the present invention, which enable users to write a content stored in a temporary recording medium into a disc-shaped recording medium.

Subsequently, a flow of processes of writing a content having been stored in a temporal recording medium, such as a hard disc drive, into a recording medium, such as a Blu-ray disc, will be described below with reference to FIG. 9. FIG. 9 is a sequence diagram illustrating an example of a flow of processes of writing a content, having been stored in a temporal recording medium, into a disc-shaped recording medium.

<A Second Record Processing Method>

The stream receiver 220 of the information distribution server 200 acquires an electrical program guide from a broadcast wave (in step S200). In the storage section 170 of the information recording apparatus 100, strings of data regarding contents having been previously received by the stream receiver 110 are temporarily stored (in step S201). The stream receiver 110 also receives the electrical program guide from the broadcast wave (in step S202). The flow of processes from step S200 to step S210 shown in FIG. 9, in which a user authentication is performed, are the same as the flow of processes from step S100 to step S112 shown in FIG. 8, and thus, is omitted from description. Once a fact that the result of the user authentication is a success is notified to the information recording apparatus 100 (in step S210), the program information transmitter 120 transmits a piece of program information regarding a content, which a user desires to write into a recording medium, the piece of program information including a channel on which the content was broadcasted, a clock time at which the content was started to be broadcasted, and the like, to the information distribution server 200 (in step S212).

On the basis of the piece of program information having been acquired from the information recording apparatus 100, the writing information creation section 230 creates pieces of scene detection information and pieces of writing information from a string of data regarding the corresponding content stored in the storage section 280 (in step S214). Subsequently, the writing information transmitter 240 transmits the created pieces of scene detection information to the information recording apparatus 100 (in step S216). Further, the writing information transmitter 240 transmits the pieces of writing information having been created by the writing information creation section 230 to the information recording apparatus 100 (in step S218). The recording section 160 included in the information section 160 writes a string of data regarding the content, which a user desires to write into a recording medium, as well as the piece of writing information having been received from the information distribution server 200, into the recording medium (in step S220).

According to this record processing method, causing the information distribution server 200, which is capable of performing high-speed processing, to undertake the processes of creating pieces of wiring information results in speedy creation of the pieces of writing information and prompt provision of the created pieces of writing information to the information recording apparatus 100. Therefore, a burden on the information recording apparatus 100, resulting from causing the information recording apparatus 100 to perform processing for writing content data into a recording medium, is reduced to a great degree. Further, the reduction of a burden on the information recording apparatus 100, for example, enables reduction of a time necessary for a content to be written into a recording medium, such as a Blu-ray disc, to a great degree.

In addition, in step S214, for example, prior to receipt of a request for provision of writing information from the information recording apparatus 100, the writing information creation section 230 may be configured so that pieces of scene detection information and pieces of writing information regarding all contents which have been broadcasted are created and stored in the storage section 280. This method enables the information distribution server 200 to provide the information recording apparatus 100 with the writing information more promptly.

<8. A Method of Synchronization of a System Clock of an Information Distribution Server with a System Clock of an Information Recording Apparatus>

Subsequently, a system clock synchronization method employed in the case where the information recording apparatus 100 according to an embodiment of the present invention receives appending information from the information distribution server 200, and writes a string of content data into a Blu-ray disc, will be described below with reference with FIGS. 10 to 12. As described below, processes shown in FIGS. 10 to 12 are successively performed.

Figure 10:
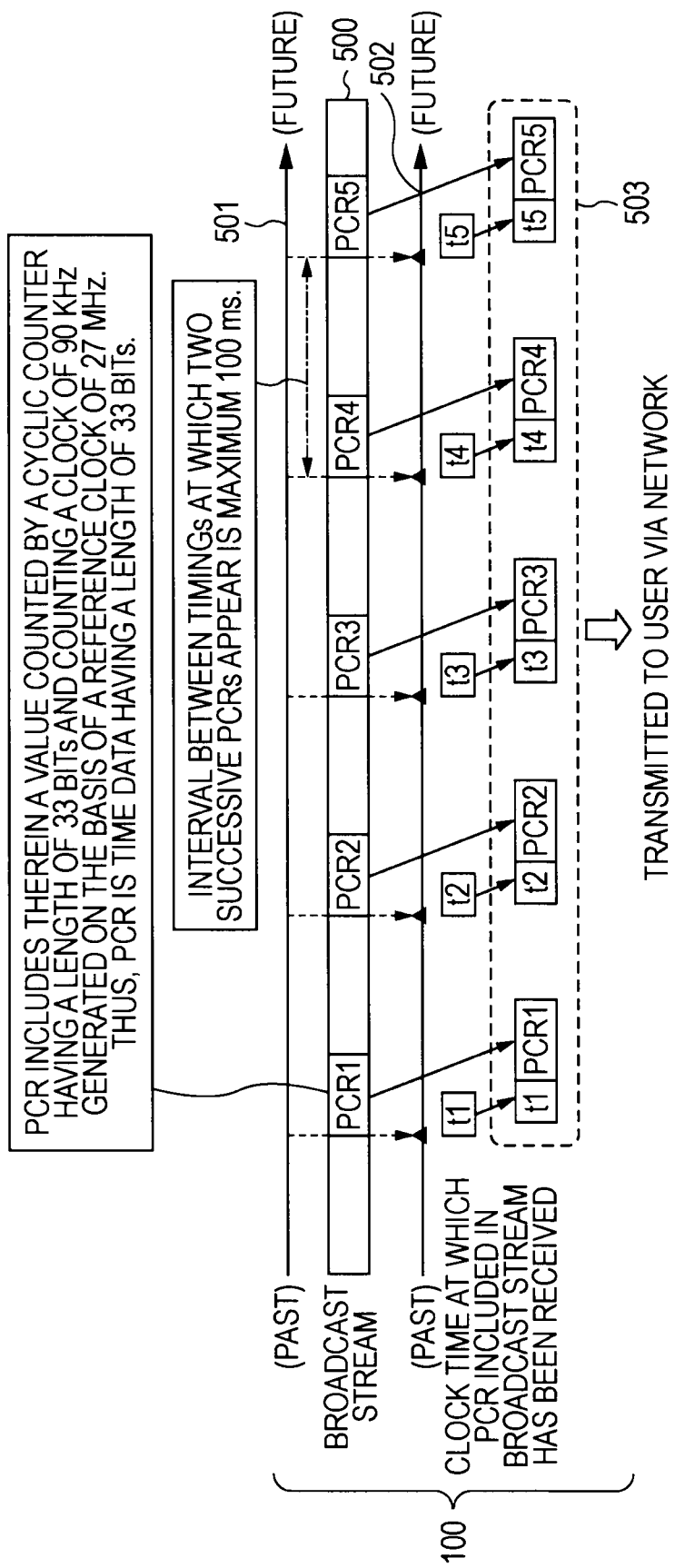
FIG. 10 is a diagram illustrating an example of processes performed by an information recording apparatus according to an embodiment of the present invention, in which pieces of absolute time information PCRs are extracted from an MPEG2-TS stream, and are transmitted to an information distribution server.

FIG. 10 is a diagram illustrating an example of processes in which pieces of absolute time information, each being denoted by PCR, are extracted from an MPEG2-TS stream, and are transmitted to the information distribution server 200 by the information recording apparatus 100 according to an embodiment of the present invention. A horizontal axis 501 represents a content transmission time axis at a broadcast station side, which depends on a clock of 90 KHz generated on the basis of a reference clock of 27 MHz. A horizontal axis 502 represents a content receipt time axis at the information recording apparatus 100 side, which depends on a clock of 90 KHz generated by the time counting section 154 on the basis of the reference clock of 27 MHz.

As shown in FIG. 10, the pieces of absolute time information PCRs are included in the MPEG2-TS stream at intervals of maximum 100 msec (PCRs 1 to 5 shown in FIG. 10) The time extraction section 150 extracts the PCRs from the MPEG2-TS stream. At the same time, on the basis of clock time information provided by the time counting section 154, the user clock time information appending section 152 records clock times, at which the PCRs were acquired by the time information extraction section 150 (t1 to t5 shown in FIG. 10), and appends these clock times to the corresponding PCRs as pieces of user clock time information. Pieces of data 503, each resulting from appending of the piece of user clock time information to the PCR having been acquired by the time information extraction information section 150, are transmitted to the information distribution server 200 by the program information transmitter 120 via the communication network 10.

Figure 11:
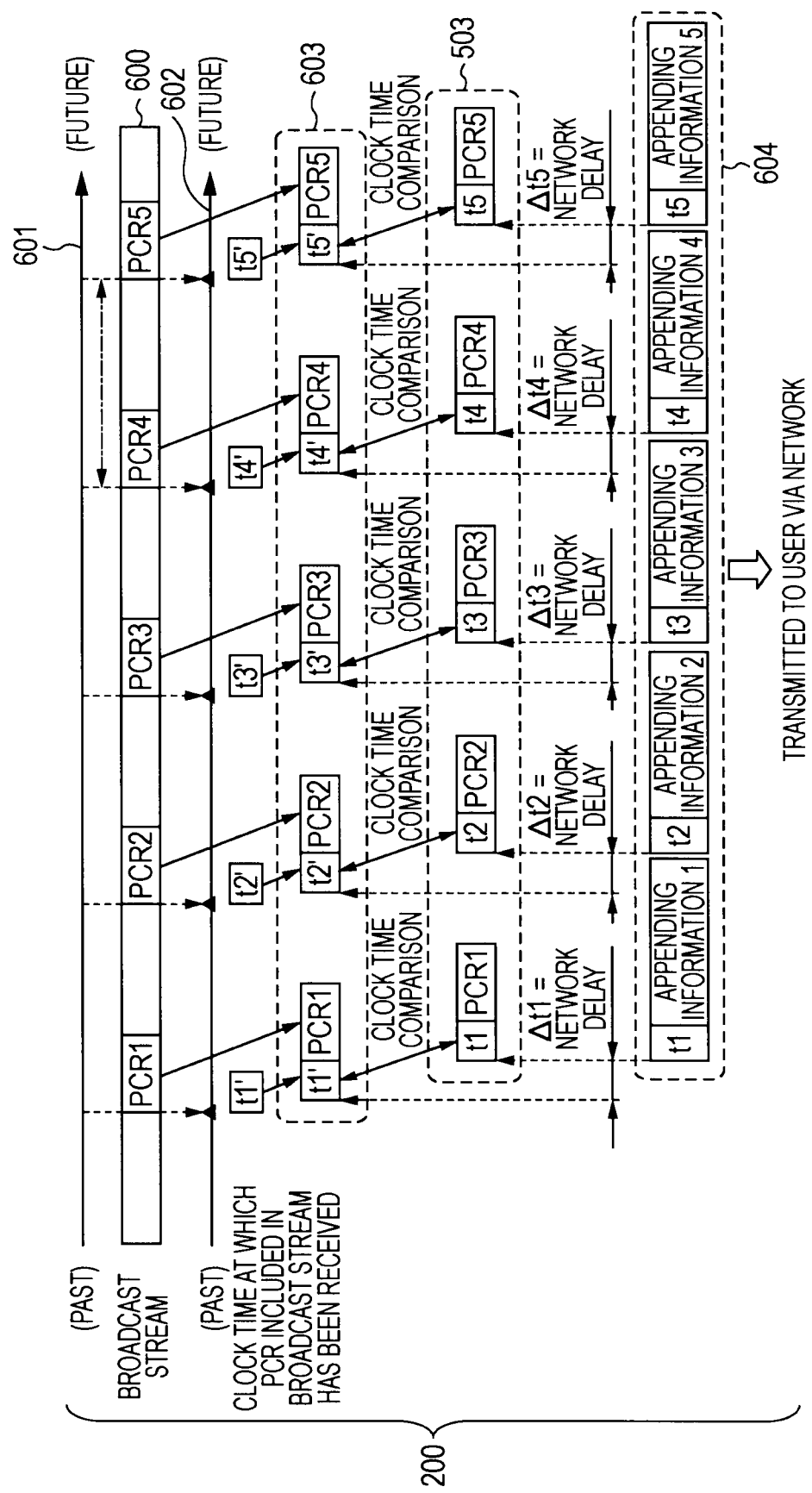
FIG. 11 is a diagram illustrating an example of processes performed by an information distribution server according to an embodiment of the present invention, in which pieces of appending information having been created from an MPEG2-TS stream under the condition in which a system clock thereof is caused to be synchronized with that of an information recording apparatus are transmitted to the information recording apparatus via a communication network.
Figure 12:
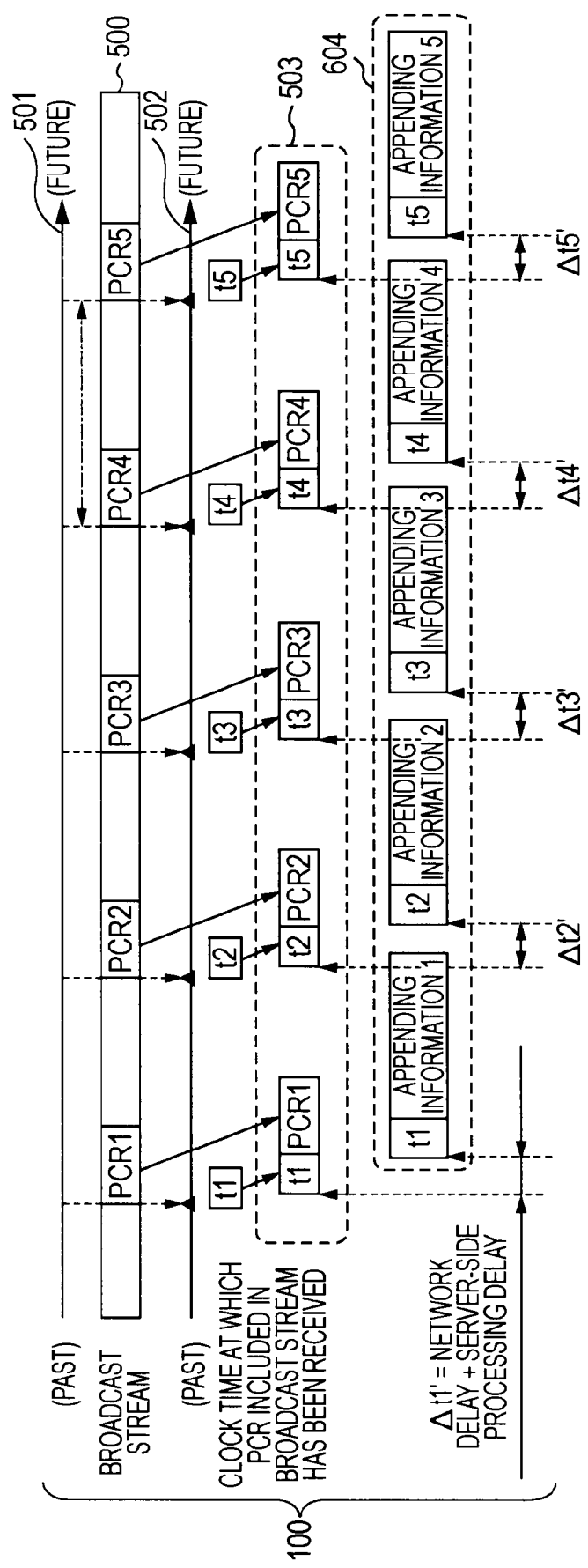
FIG. 12 is a diagram illustrating an example of processes performed by an information recording apparatus according to an embodiment of the present invention, in which a content is written into a Blu-ray disc by utilizing appending information having been received from an information distribution server.

FIG. 11 is a diagram illustrating an example of processes in which, in the information distribution server 200 according to an embodiment of the present invention, pieces of appending information having been created from an MPEG2-TS stream under the condition in which a system clock thereof is synchronized with that of the information recording apparatus 100 are transmitted to the information recording apparatus 100 via the communication network 10. A horizontal axis 601 represents a content transmission time axis at a broadcast station side, which depends on a clock of 90 KHz generated on the basis of a reference clock of 27 MHz. A horizontal axis 602 represents a content receipt time axis at the information distribution server 200 side, which depends on a clock of 90 KHz generated by the time counting section 254. In addition, pieces of data 503 shown in FIG. 11 is the same as the pieces of data 503 shown in FIG. 10. Further, the MPEG2-TS stream 600 shown in FIG. 11 is the same as the MPEG2-stream 500 shown in FIG. 10.

The time information extraction section 250 extracts PCRs from the MPEG2-TS stream 600. At the same time, on the basis of clock time information provided by the time counting section 264, the server clock time information appending section 262 records clock times, at which the PCRs were acquired by the time information extraction section 250, as pieces of server clock time information (t1' to t5' shown in FIG. 11), and appends the pieces of server clock time information to the corresponding PCRs. The pieces of data including the pieces of server clock time information appended to the PCRs correspond to data 603 shown in FIG. 11. The clock time comparison section 266 compares the pieces of user clock time information included in the data 503 with the pieces of server clock time information included in the data 603, respectively, and thereby, a clock time difference between a system clock, which is generated by the time counting section 264 on the basis of the system clock of 90 KHz of the information distribution server 200, and a system clock, which is generated by the time counting section 154 on the basis of the system clock of 90 KHz of the information recording apparatus 100, is calculated. On the basis of the calculated clock time difference, the clock time correction section 268 synchronizes the system clock of 90 KHz included in the time counting section 264 with the system clock of 90 KHz of the information recording apparatus 100. Subsequently, the server writing information creation section 240 creates pieces of appending information from blocks of data included in the body of content data (pieces of appending information 1 to 5 shown in FIG. 11). Further, the server clock time information appending section 262 appends pieces of server clock time information, which are generated on the basis of the clock time information included in the time counting section 264, having been synchronized with that of the information recording apparatus 100, to the corresponding pieces of appending information. Subsequently, the server clock time information appending section 262 transmits pieces of data 604 resulting from appending of the pieces of server clock time information to the corresponding pieces of appending information to the information recording apparatus 100. Performing such processes as described above enables synchronization of the system clock of the time counting section 264 with the system clock of the time counting section 154 included in the information recording apparatus 100, even when there is a time difference between the system clock of the information recording apparatus 100 and that of the information distribution server 200. In addition, in the case where both the system clock of 90 KHz of the information recording apparatus 100 and the system clock of 90 KHz of the information distribution server 200 are synchronized with the global clock, since clock times generated on the basis of the system clocks correspond to each other, it is unnecessary to perform the above-described system clock synchronization.

FIG. 12 is a diagram illustrating an example of processes in which the information recording apparatus 100 according to an embodiment of the present invention writes content data into a Blu-ray disc by utilizing appending information having been received from the information distribution server 200. The horizontal axes 501 and 502 shown in FIG. 12 are the same as those shown in FIG. 10. The pieces of data 503 and the pieces of data 604 shown in FIG. 12 are the same as the pieces of data 503 shown in FIG. 10 and the pieces of data 604 shown in FIG. 11, respectively.

The writing information receiver 130 receives pieces of data 604, each including a piece of appending information to which a piece of server clock time information is appended, from the information server 200 via the communication network. The writing information receiver 130 calculates clock time differences ($\Delta t1'$ to $\Delta t5'$ shown in FIG. 12) between pieces of user clock time information included in the pieces of data 503 and the corresponding clock times at which the pieces of data 604 were received. Each of the calculated clock time differences is the total amount of a network delay time and a processing delay time due to processing inside the information distribution server 200. The synchronization section 140 performs delay adjustment processing on the basis of the pieces of clock time difference information obtained by the writing information receiver 130. Further, the synchronization section 140 causes each of pieces of absolute time information included in the stream to correspond to a piece of appending information having been created from a block of content data including the piece of absolute time information. In this manner, the recording section 160 can write blocks of data included in a stream into a recording medium, as well as the pieces of appending information, under the condition in which each of the pieces of absolute time information included in the stream is synchronized with a piece of absolute time information included in the corresponding piece of appending information included in the pieces of data 604 having been received from the information distribution server 200. In addition, the network delay time, which is necessary for data transmission and receipt performed over the communication network, is around several seconds at most.

The present application contains subject matter related to that disclosed in Japanese Priority Patent Application JP 2009-097927 filed in the Japan Patent Office on Apr. 14, 2009, the entire content of which is hereby incorporated by reference.

Hereinbefore, examples of a preferred embodiment according to the present invention have been described in detail with reference to accompanying drawings, but the present invention is not limited to the examples. Obviously, those having normal knowledge in the technical field to which the present invention belongs can conceive various modified or corrected examples within the scope of technical concept described in the claims of the present invention, and naturally, it assumed that any of the modified or corrected examples is included in the technical scope of the present invention.

For example, in the above-described example, an example in which the recording medium is a Blu-ray disc is provided, but the present invention is not limited to this example.

What is claimed is:

1. An information recording apparatus, comprising:
   a stream receiver operable to receive a stream from a broadcasting source, the stream comprising video and audio data for a program;
   a program information transmitter operable to transmit program information regarding the program, absolute time information contained in the stream, and a first clock time information appended to the absolute time information to a server, the program information transmitter coupled to the server via a communication network, wherein the server separately receives the stream from the broadcasting source;
   a writing information receiver operable to:
      receive writing information from the server, wherein the writing information is associated with the video and audio data; and
      determine a time delay corresponding to a network delay and a server processing delay based on the appended first clock time information and a second clock time at which the writing information is received;
   a recording section operable to write the video and audio data and the writing information into the recording medium by compensating the determined time delay in generating the writing information.

2. The information recording apparatus according to claim 1, further comprising:
   a synchronization section operable to control writing processing performed by the recording section so that absolute time information contained in the stream and absolute time information contained in the writing information having been received from the server are synchronized with each other.

3. The information recording apparatus according to claim 2, further comprising:
   a time information extraction section operable to extract absolute time information contained in the stream; and
   a user clock time information appending section operable to append the first clock time information regarding a clock time, at which the absolute time information is extracted, to the absolute time information;
   wherein the program information transmitter is further operable to transmit the absolute time information, to which the first clock time information is appended, to the server, and
   wherein the writing information receiver is further operable to receive the writing information on the basis of the first clock time information, wherein the writing information is created when clock time information provided by the server is caused to be synchronized with the first clock time information provided by the information recording apparatus.

4. The information recording apparatus according to claim 3, further comprising:
   a time counting section operable to include absolute clock time information;
   wherein the first clock time information is obtained on the basis of the absolute clock time information of the time counting section.

5. The information recording apparatus according to claim 2, wherein the writing processing performed by the recording section is performed concurrently with broadcasting of the program.

6. An information distribution server, comprising:
- a program information receiver operable to receive program information regarding a program recorded by an information recording apparatus and a first user clock time information from the information recording apparatus via a communication network;
- a stream receiver operable to receive the stream from a broadcasting source, the stream comprising video and audio data for the program, wherein the information recording apparatus separately receives the stream from the broadcasting source;
- a writing information creation section operable to create writing information, wherein the writing information is associated with the video and audio data; and
- a writing information transmitter operable to transmit the writing information to the information recording apparatus, wherein the information recording apparatus determines a time delay corresponding to a network delay and a server processing delay based on the first user clock time information and a second user clock time at which the writing information is received by the information recording apparatus.

7. The information distribution server according to claim 6, further comprising:
- a time information extraction section operable to receive the first user clock time information from the information recording apparatus, wherein the first user clock time information indicates a clock time at which absolute time information contained in the stream is extracted by the information recording apparatus, and extract absolute time information contained in the stream; and
- a server clock time information appending section operable to append server clock time information regarding a clock time, at which the absolute time information is extracted, to the absolute time information;
- wherein the writing information creation section is further operable to create the writing information when the first user clock time information and the server clock time information are synchronized with each other.

8. The information distribution server according to claim 6, further comprising:
- a time counting section operable to include absolute clock time information;
- wherein the server clock time information is obtained on the basis of the absolute clock time information contained in the time counting section.

9. The information distribution server according to claim 6, further comprising:
- a storage section operable to store therein preference information, wherein the preference information is information regarding a program previously recorded by the information recording apparatus, and content data previously acquired by the stream receiver;
- wherein the writing information creation section is further operable to, in accordance with the preference information, create the writing information regarding a program from the content data stored in the storage section.

10. The information distribution server according to claim 6, wherein transmitting of the writing information performed by the writing information transmitter is performed concurrently with broadcasting of the program.

11. An information recording system, comprising:
an information recording apparatus, comprising:
- a stream receiver operable to receive a stream from a broadcasting source, the stream comprising video and audio data regarding a program,
- a program information transmitter operable to transmit program information regarding the program, absolute time information contained in the stream and a first clock time information appended to the absolute time information to a server via a communication network,
- a writing information receiver operable to:
  - receive writing information from the server, wherein the writing information is associated with the video and audio data, and
  - determine a time delay corresponding to a network delay and a server processing delay based on the appended first clock time information and a second clock time at which the writing information is received;
- a recording section operable to write the video and audio data and the writing information into the recording medium by compensating the time delay in generating the writing information; and
the server, comprising:
- a program information receiver operable to receive program information regarding a program recorded by the information recording apparatus from the information recording apparatus via a communication network,
- a stream receiver operable to receive a stream from the broadcasting source, the stream comprising video and audio data regarding the program,
- a writing information creation section operable to create writing information which is used when the information recording apparatus performs processing for writing the video and audio data into a recording medium, and
- a writing information transmitter operable to transmit the writing information to the information recording apparatus.

12. An information recording method, comprising:
receiving a stream from a broadcasting source, the stream comprising video and audio data regarding a program, by an information recording apparatus;
transmitting program information regarding the program and a first clock time information to a server via a communication network from the information recording apparatus;
acquiring the same stream as the stream, from the broadcasting source, by the server;
creating writing information from the video and audio data by the server, the writing information being used when the information recording apparatus writes the video and audio data into a recording medium;
transmitting the writing information to the information recording apparatus via the communication network from the server;
determining a time delay corresponding to a network delay and a server processing delay based on the appended first clock time information and a second clock time at which the writing information is received by the information recording apparatus; and
writing the video and audio data and the writing information into the recording medium by compensating the determined time delay in generating the writing information, by the information recording apparatus, when absolute time information contained in the stream and absolute time information contained in the writing information received from the server are synchronized with each other.

13. The information recording method according to claim 12, wherein transmitting the writing information to the information recording apparatus is performed concurrently with broadcasting of the program.

14. The information recording method according to claim 12, further comprising storing preference information, wherein the preference information is information regarding a program previously recorded by the information recording apparatus.

15. The information recording method according to claim 12, wherein the writing information is created when a user clock time information and a server clock time information are synchronized with each other.

* * * * *